Jan. 14, 1930.  A. A. LANDON ET AL  1,743,462
MOLDING MACHINE OR APPARATUS
Filed Feb. 14, 1924   9 Sheets-Sheet 9
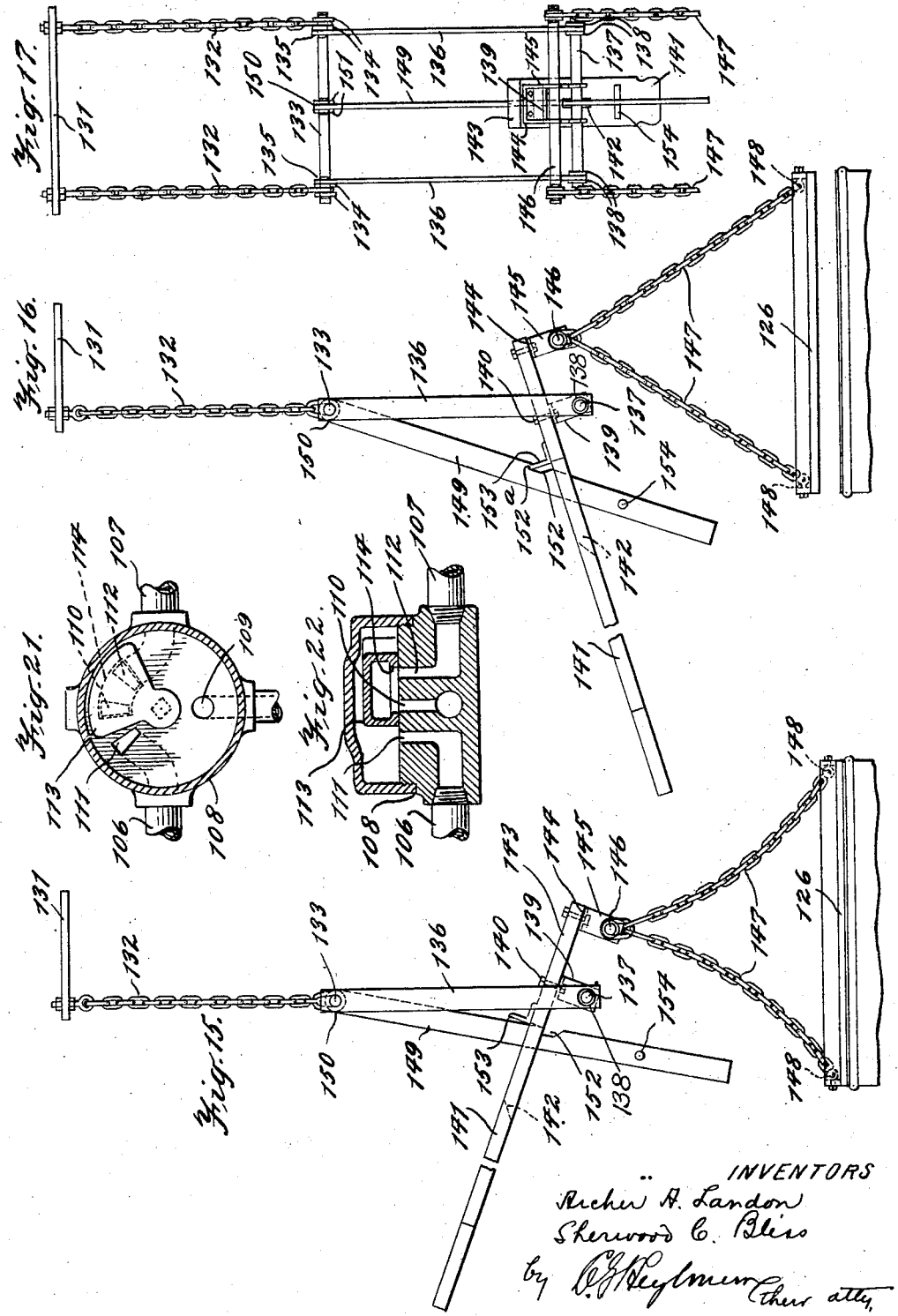
INVENTORS
Archer A. Landon
Sherwood C. Bliss
by their atty.

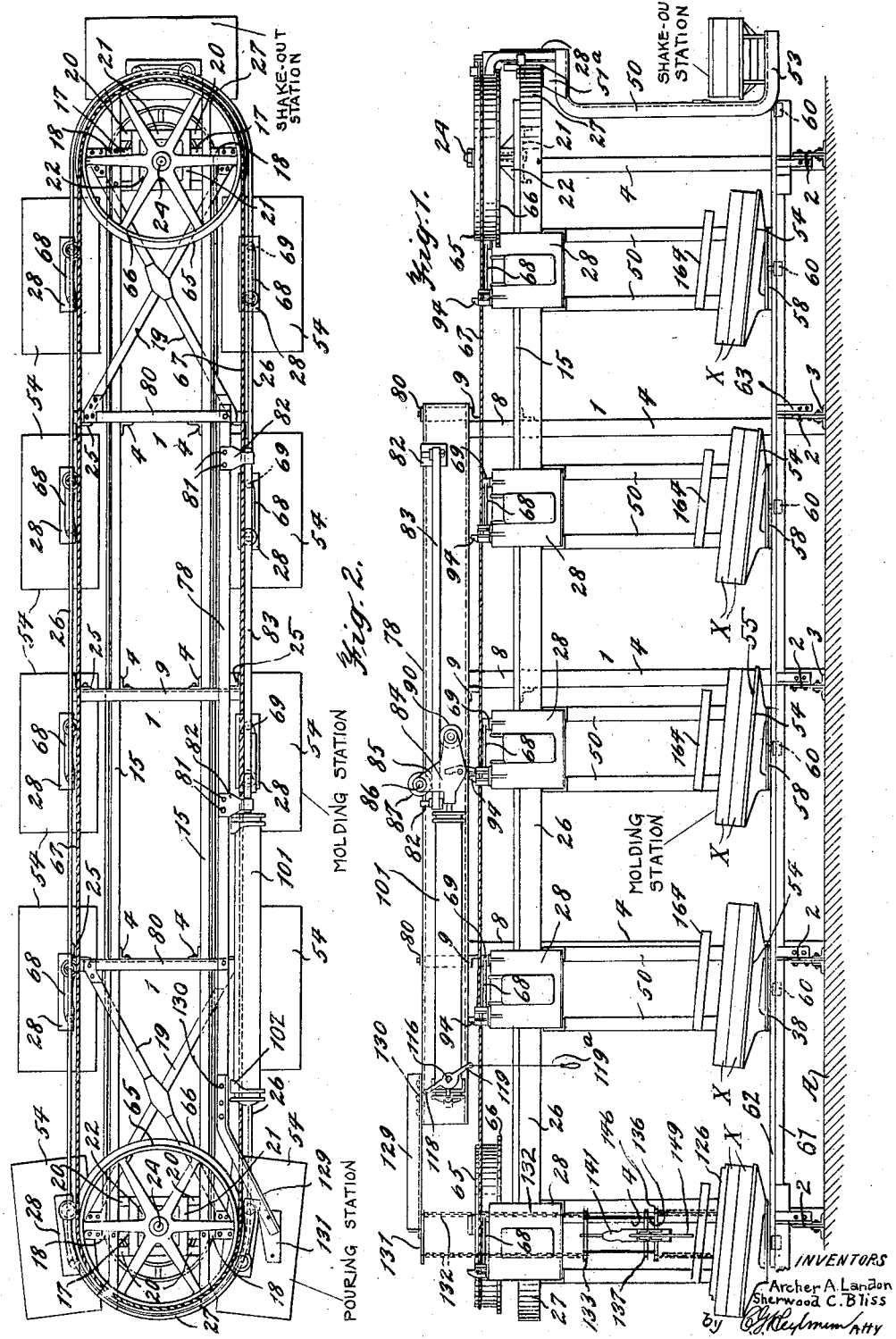

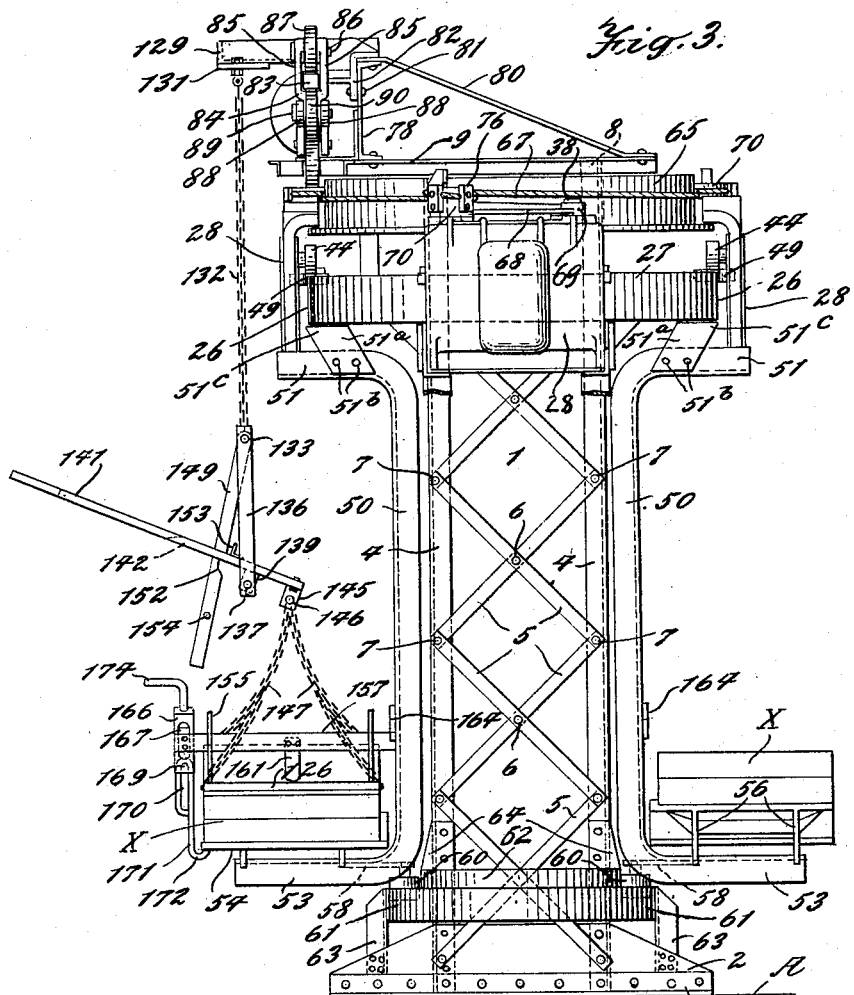
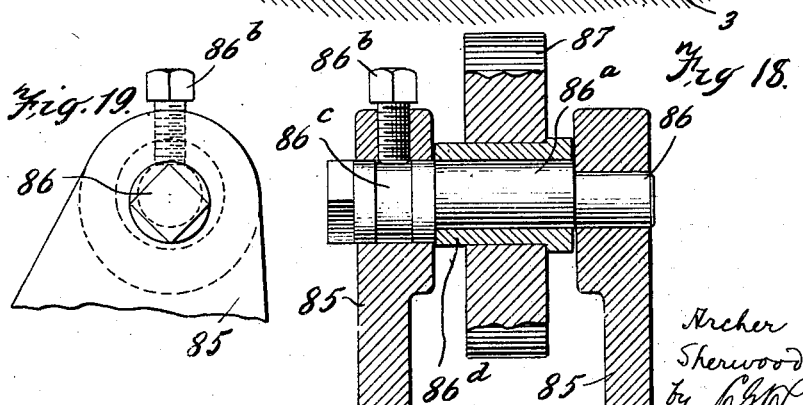

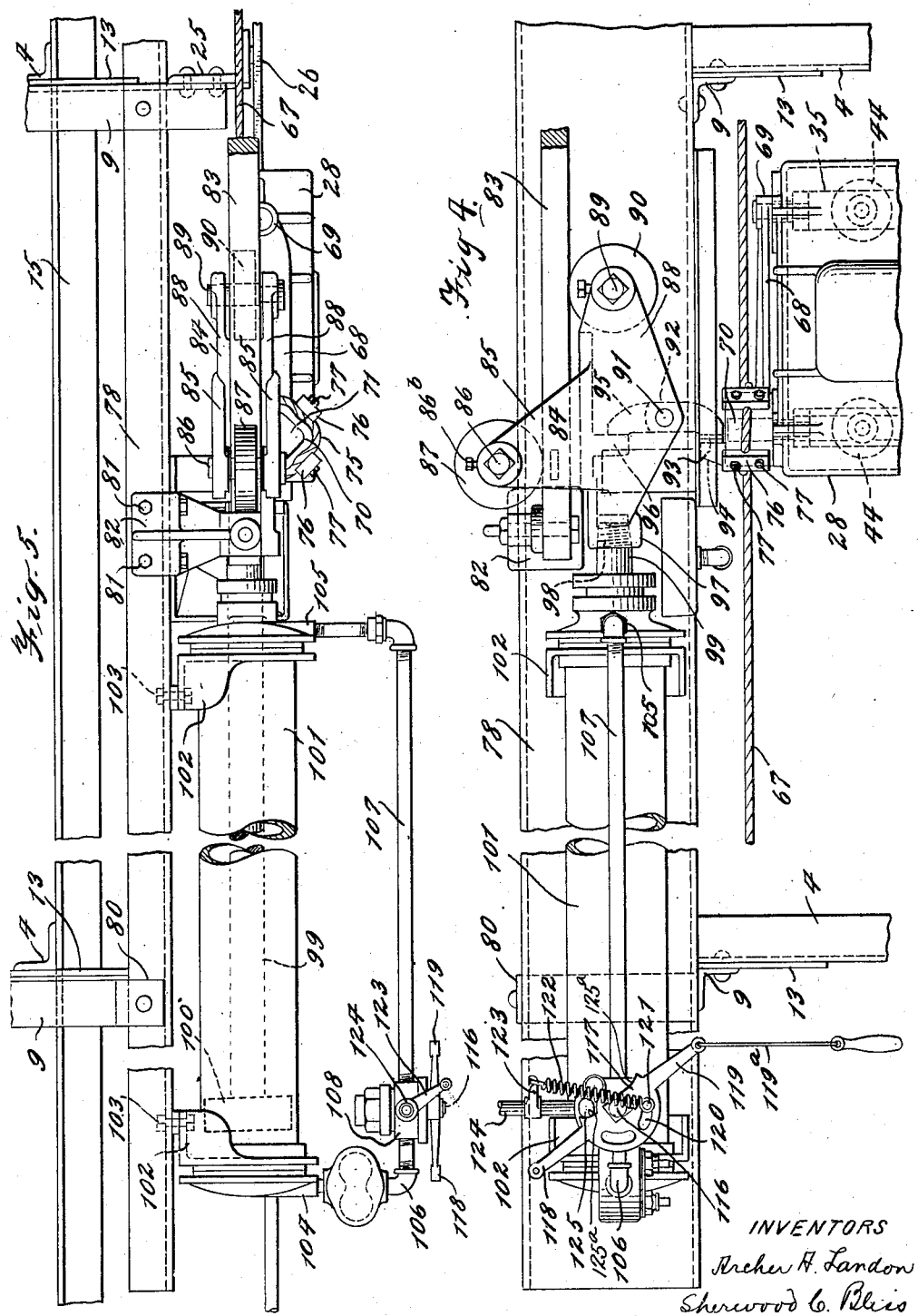

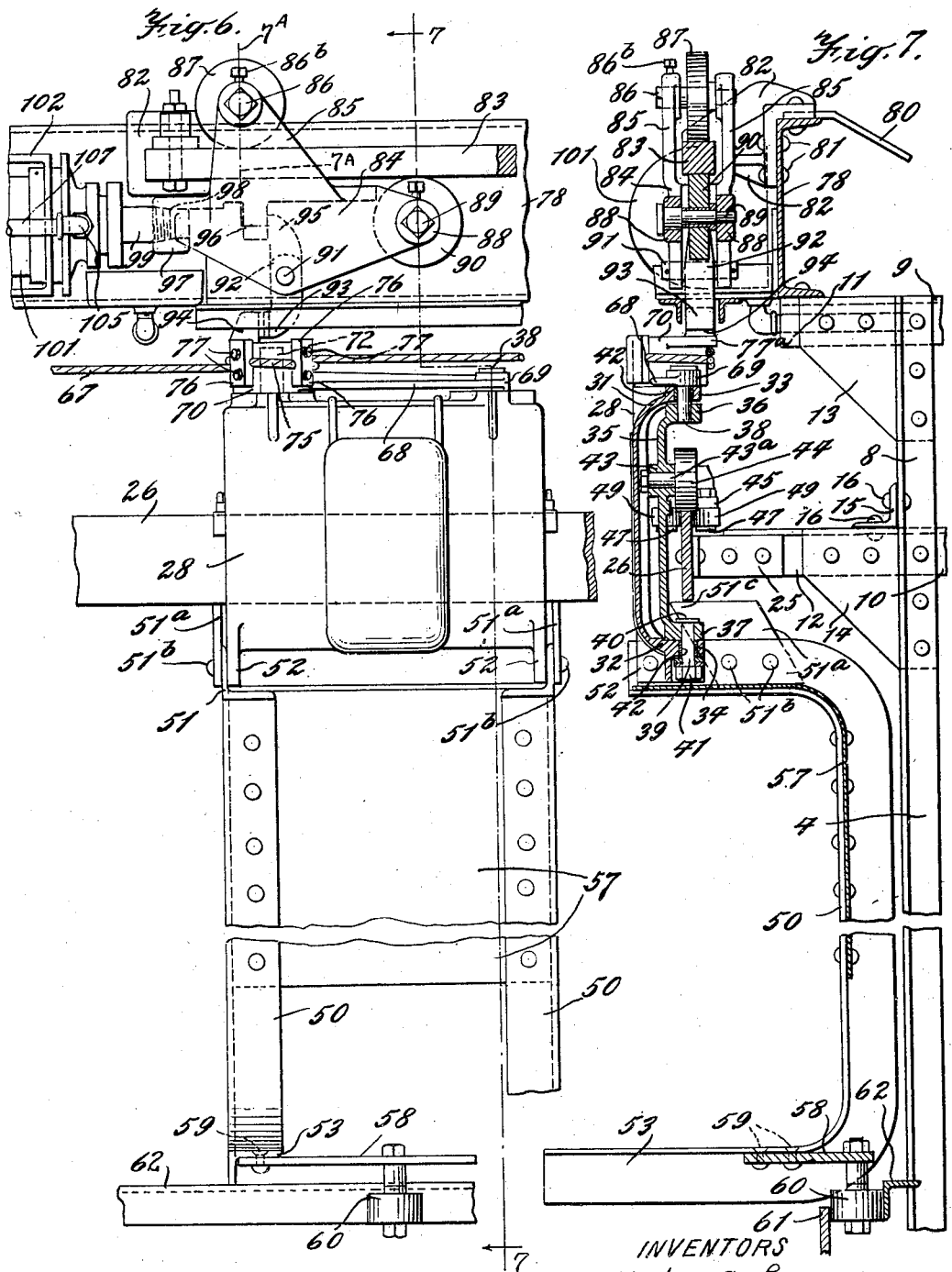

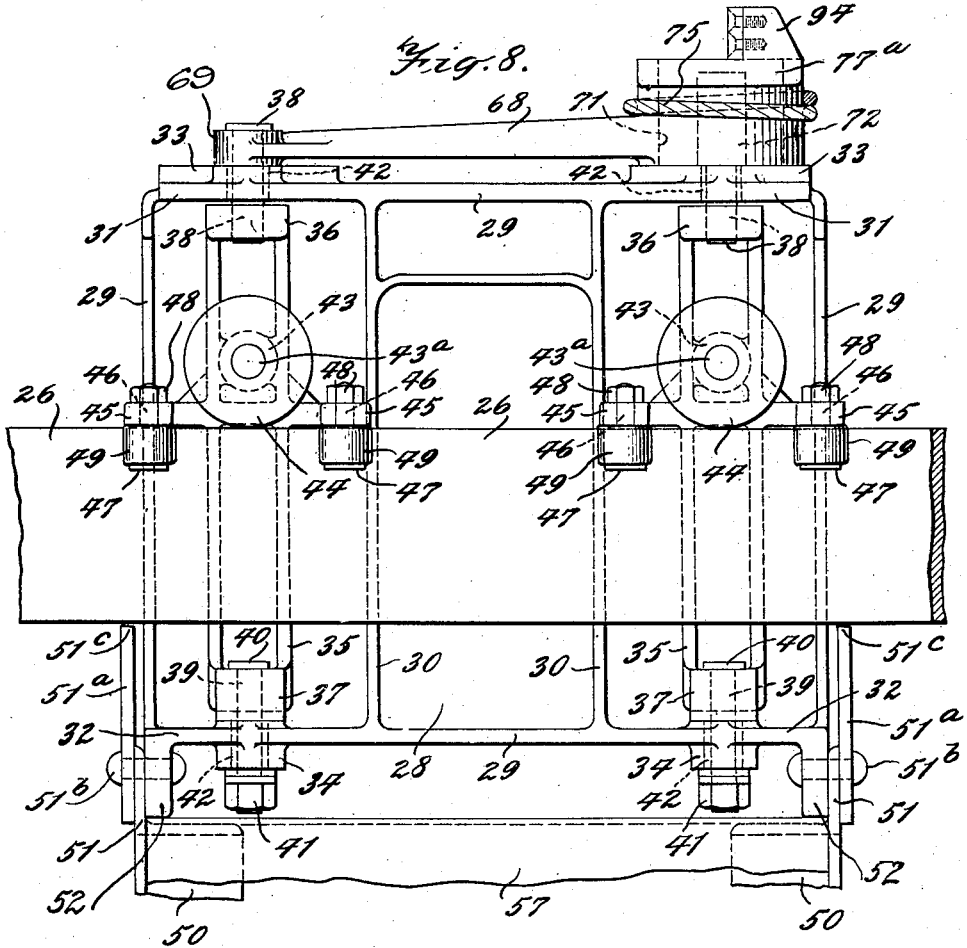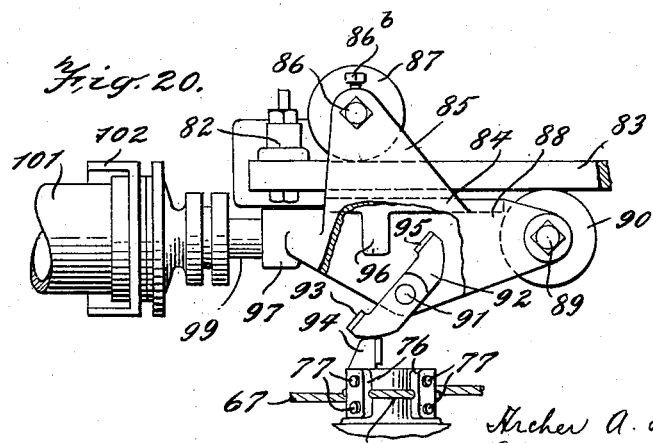

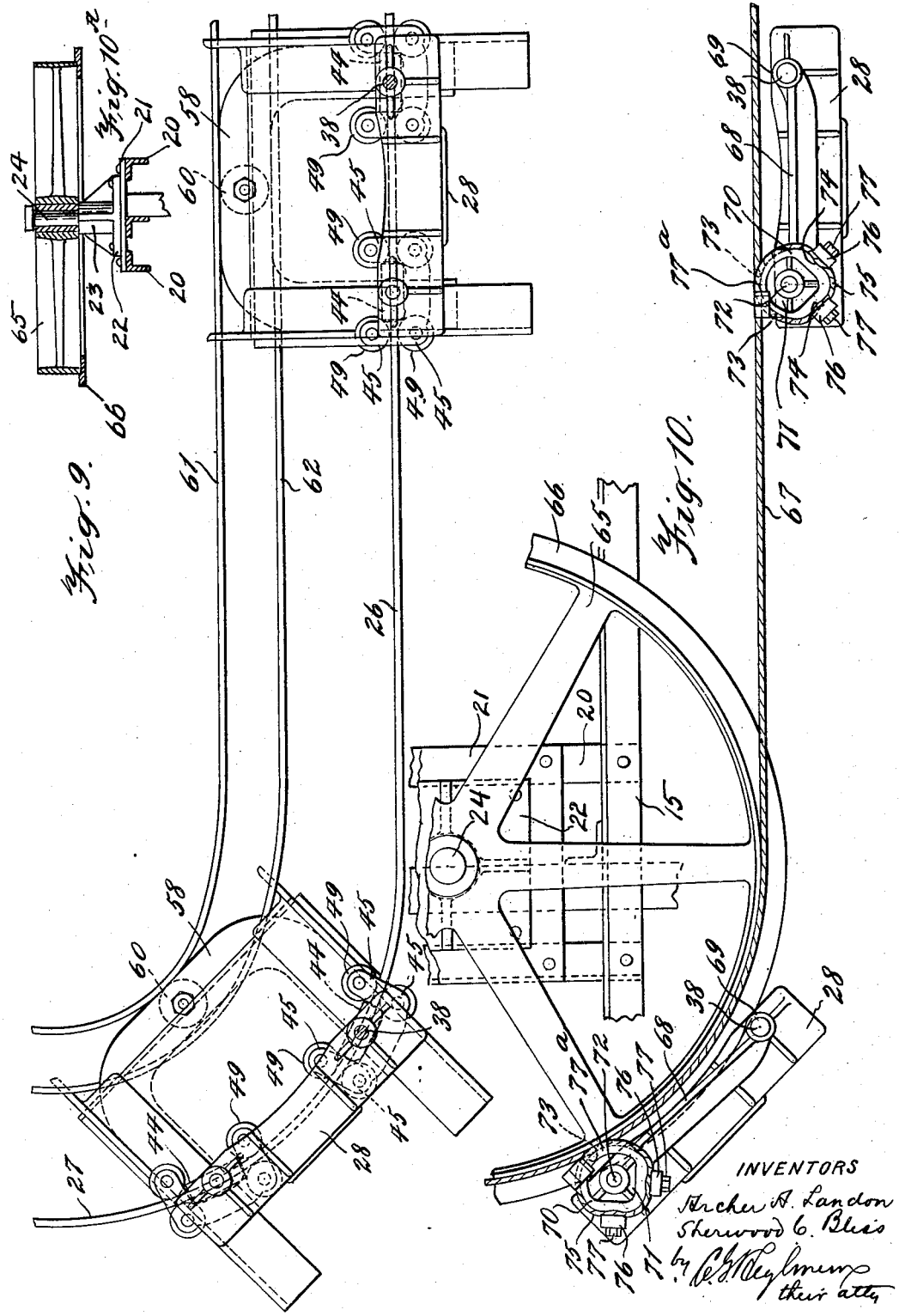

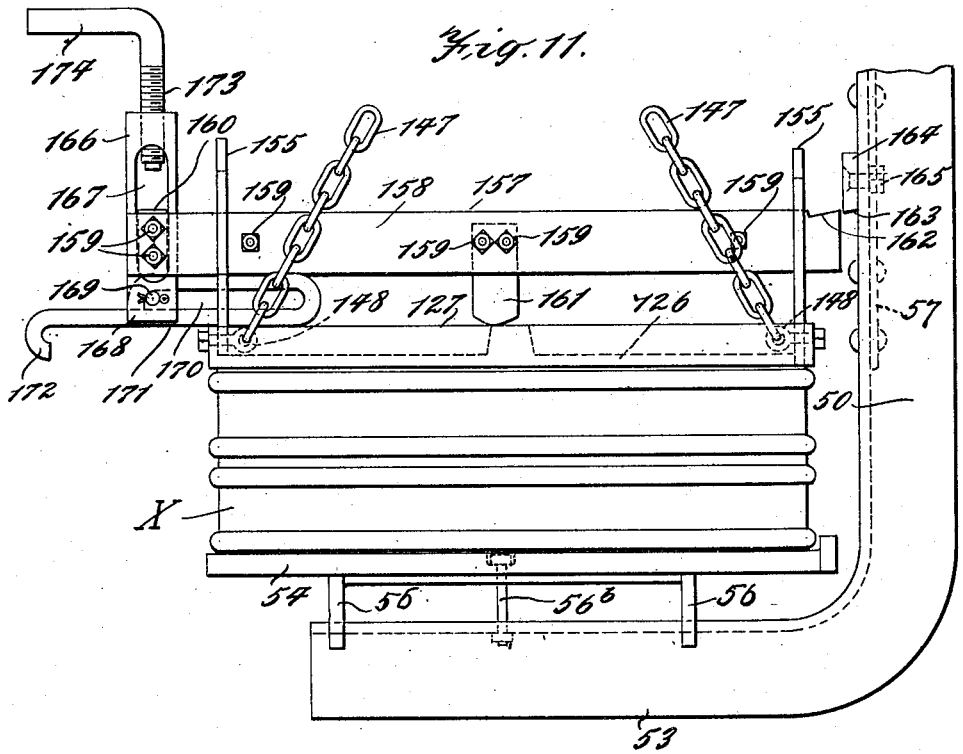
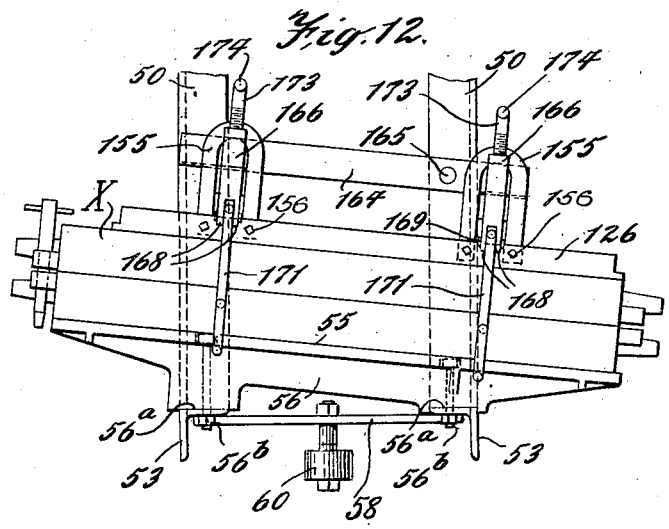

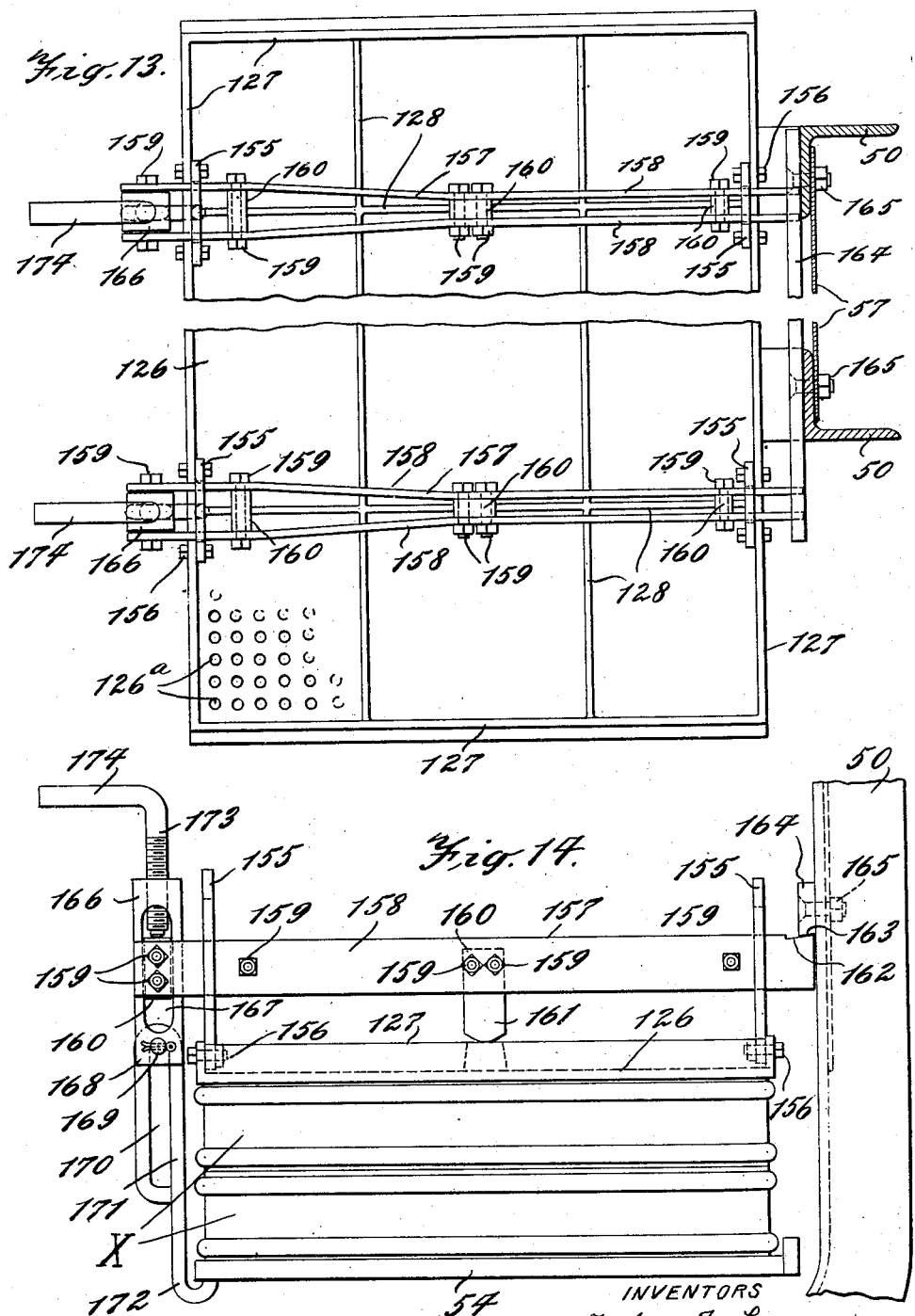

Patented Jan. 14, 1930

1,743,462

UNITED STATES PATENT OFFICE

ARCHER A. LANDON, OF BUFFALO, AND SHERWOOD C. BLISS, OF KENMORE, NEW YORK, ASSIGNORS TO AMERICAN RADIATOR COMPANY, OF NEW YORK, N. Y., A CORPORATION OF NEW JERSEY

MOLDING MACHINE OR APPARATUS

Application filed February 14, 1924. Serial No. 692,624.

This invention relates broadly and generally to new and useful improvements in molding machines or apparatus, and more particularly of that character or type adapted to support and transport molds or the like during various operations attending the casting of metal objects.

The primary object of the invention, among others which will be apparent from the following description, is to provide an efficient apparatus for supporting and transporting molds to and through stations or zones at which different molding or casting operations take place or are performed.

The invention consists in the novel construction and combination of parts in operative aggroupment, to be more fully described hereinafter, and the novelty of which will be particularly pointed out and distinctly claimed.

A preferred embodiment of the invention is fully and clearly illustrated in the accompanying drawings to be taken as a part of this specification, and wherein—

Figure 1 is a view in side elevation of a machine embodying our invention;

Fig. 2 is a top plan view of the construction shown in Fig. 1;

Fig. 3 is a view in end elevation of the construction shown in Figs. 1 and 2, looking from the right of the latter;

Fig. 4 is an enlarged view in side elevation of propelling means for driving the mold-carriers or supports;

Fig. 5 is a top plan of the construction shown in Fig. 4;

Fig. 6 is a side elevation of a hanger for a mold-carrier or support, and also showing a portion of the driving or propelling means;

Fig. 7 is a sectional view on the line 7—7 of Fig. 6;

Fig. 8 is an enlarged elevation of a hanger for the mold-support, taken from the opposite side or face of Fig. 6;

Fig. 9 is a top plan view of the hangers for the mold-carriers, and of the track and guides for said hangers;

Fig. 10 is a plan view showing the hanger, compensating connections, and the means for connecting the same to a flexible element, in the positions assumed by said parts, both during straight travel and when passing around a carrying member;

Fig. 10$^A$ is a transverse sectional view through a guide-pulley and its support or bearing;

Fig. 11 is an end view of a portion of a mold-carrier or support with a clamp for securing a top-plate on a mold on said support, said clamp being in a released or disengaged position;

Fig. 12 is a front elevation looking toward the left of Fig. 11, the clamp being shown in engaged position;

Fig. 13 is a top plan view of the construction shown in Figs. 11 and 12;

Fig. 14 is a view similar to Fig. 11 but showing the clamp in locking or clamping relation to the mold-carrier and a top-plate on a mold carried thereon;

Fig. 15 is a view of a mold top-plate lifter in lowered position;

Fig. 16 is a view of the mold top-plate lifter in position to raise a top-plate from a mold;

Fig. 17 is a front view of the construction shown in Figs. 15 and 16, and looking toward the right-hand side of said figures;

Fig. 18 is an enlarged sectional view on the line 7$^A$—7$^A$ of Fig. 6;

Fig. 19 is an enlarged side view of the construction shown in Fig. 18;

Fig. 20 is a detail view, partly in section, and partly broken away, of means for connecting the propelling or driving means with a hanger for a mold-carrier, and Figs. 21 and 22 are details of one form of control valve which may be employed in the present embodiment.

Referring to the drawings by characters of reference, A designates a supporting base, for example, a floor of a structure within which the apparatus is to be located. Supported upon and rising from the base A is a plurality of columns or standards designated, generally, at 1, and which may be of any suitable construction applicable to the purpose for which they are employed. Preferably, each column or standard comprises a transverse horizontal foot-piece in the form of a metallic plate member 2 arranged in a vertical plane and provided at its base with angle-irons or flanges 3 secured to said member and resting upon said base A. Rising from the foot-piece is a pair of vertical, spaced, parallel angle-beams 4, 4, connected to each other and braced and stiffened by transverse, inclined tie-members 5, riveted to each other, as at 6, and riveted at their ends to said beams 4, as at 7, whereby a rigid and substantial column structure is provided. The lower ends of the members 4 are rigidly connected, as by rivets, to the foot-piece 2 at points intermediate the ends of the latter, so that said ends of the foot-piece project laterally beyond the sides of the columns or members 4 (see Fig. 3) and prevent any tendency of the latter to tilt or rock sidewise during the operation of the machine.

The upper end portions of the intermediate members 4, 4 project upward a greater distance, as at 8, than the upper ends of the end members 4, 4, for a purpose to be presently set forth, and the said intermediate members 4, 4 of each standard are connected and braced by upper and lower horizontal, transverse members 9, 10, the opposite ends of which project beyond the outer faces of members 4, 4, as at 11, 12, respectively (see Fig. 7), for a purpose to more fully appear hereinafter. The projecting ends 11, 12 are, in each instance, braced by means of brackets or gussets 13, 14, riveted to the said ends and the adjacent member 4, as clearly shown in Fig. 7.

The standards just described are connected to each other and braced longitudinally of the structure by longitudinally extending members 15, 15, consisting of angle-irons, the flanges of which are riveted, as at 16 (see Fig. 7), to the projecting members 12 and the adjacent columns 4. The extreme end standards are connected by transverse members 17 corresponding to the members 10 heretofore described (see Fig. 2), said members 17 having laterally projecting end portions 18 underlying and connected to the rails 15 which are riveted to said end portions. The projecting portions 18 on the end standards are connected to the projections 12 on the next adjacent standard by means of diagonal struts 19 (Fig. 2), whereby the supporting frame or structure is further braced and stiffened.

On opposite sides of each of the columns 4 of each of the end standards, the members 15 are rigidly connected, in any suitable manner, by parallel, transverse tie-members 20, upon which is suitably and rigidly supported a plate 21, upon the upper face of which is mounted and suitably held an idler pulley-stud bracket 22 having a vertical bore or socket 23, in which is seated a pulley-stud 24 to support a pulley to be presently described.

On the projecting parts 12 are riveted angle-brackets 25 (see Figs. 2, 5 and 7), rigidly supporting a longitudinally extending track rail 26 adapted to support travelling mold-carriers to be presently described. It will be understood that there is a track rail 26 on each side of the frame and extending longitudinally thereof, the opposite ends of said rails being connected by curved track rails 27 supported by projecting ends of said members 15, as shown in dotted lines in Fig. 2 of the drawings. By the construction described a continuous endless trackway is provided, but it will be understood that the invention is not limited to the particular course or travel of the trackway. The various structural elements heretofore set forth are riveted or bolted together in a well-known manner to provide a rigid and substantial structure.

A novel construction of mold-carrier and means for suspending the same from the track composed of the rails 26, 27, will now be described: 28 designates a hanger-frame member, preferably in the form of a rectangular, vertically disposed plate consisting, preferably, of a casting having marginal stiffening flanges or ribs 29 and vertical face ribs 30 merging at their ends with the said upper and lower marginal flanges (see Fig. 8). At its upper and lower horizontal edges the plate 28 is directed inwardly, as at 31, 32, to constitute bearing members for a purpose to be presently described. The upper and lower members 31, 32 are provided adjacent the vertical side portions of the hanger-plate with pairs of upper and lower alining apertured bosses 33, 34, respectively, and between the bosses of each pair are vertically disposed roller hangers or brackets 35. The roller hangers 35 are each provided with upper and lower apertured bosses 36, 37, the apertures of which register with the apertures in the bosses 33, 34, and through said alining apertures are arranged bearing pins 38, 39, which constitute pivots upon which said hangers 35 are adapted to swing or oscillate on a vertical axis. The upper pins 38 are extended upward above the member 28, for a purpose to be presently set forth, while each of the lower pins 39 may consist of a headed bolt, the head 40 of which rests upon the upper face of the lower boss 37, the lower end of said bolt projecting below the lower boss 34, and carrying a nut 41 by which said frame 28 is suspended from said hangers 35, as shown in Figs. 7 and 8, there being clearance between the upper faces of the bosses 33, and the upper faces of the bosses 36. Suitable bearing bushings 42 may be arranged in the bosses 33, 34 and surrounding the pins 38, 39.

Each hanger 35, preferably at a point above its longitudinal center, is provided with an apertured boss 43 in which is seated and held a laterally extending bearing pin or stud 43$^a$, upon which is mounted a bearing roller 44 arranged to travel on the upper face or tread of the track rails 26, 27, and also constituting a running means by which the hanger-frame 28 is supported from said track rails.

Each member 35 is provided with means for preventing lateral displacement of the hanger from said track rail, and for this purpose is provided adjacent said roller 44 with oppositely disposed pairs of apertured bosses 45, in each of which is fixed a vertical bearing pin 46, each consisting of a bolt having a lower headed end 47 located beneath its boss, and the upper end projecting above the boss and carrying a nut 48, by means of which the pin is held in place. Each pin 46 carries and serves as a journal for a vertically disposed guide roller 49, the arrangement being such that each pair of rollers straddles the rails 26, 27 and individually cooperate with the opposite vertical faces of said rails to prevent displacement of the hanger-frame therefrom, and also to assure proper travel of the rollers 44 on the track rails. It will also be seen that by virtue of the flexible pivotal mounting of the hanger-members 35, the latter may oscillate freely on their pivots, so that the rollers 49 will conform to the trackway and pass freely around the curved portions 27 of the trackway, without the hanger-frame being subjected to deleterious strains.

From the hanger-frame just described is suspended a mold-carrier comprising vertically disposed parallel members 50, consisting of angle structural-iron members, preferably arranged to travel closely adjacent but free from the members 4 of the main frame, as shown in Figs. 3 and 7, which members are provided at their upper ends with horizontal, outwardly directed members 51, which are riveted, or otherwise connected rigidly to lugs 52 on the plate 28, so that said members travel with said hanger-frame 28 when the latter is moved along the track rail. At their lower end portions the members 50 carry outwardly directed horizontal members 53, upon which is supported a platform 54 which may, if desired, constitute a mold bottom-plate, the supporting surface of said platform being preferably inclined, as at 55 (Figs. 1 and 12), so that the molten metal in a mold supported on the platform will flow properly. The platform is preferably provided on its bottom with ribs 56, having alining horizontal faces 56ª (Figs. 11 and 12) adapted to rest on members 53. The bottom-plates 54 are held in place by bolts 56ᵇ passed through said plates and the members 53. At their upper ends the members 50 are preferably held and braced in spaced relation by a plate 57, the side edges of which are riveted to the flanges of the said members 50.

The members 53 are connected by a horizontal plate 58 (see Figs. 6, 7 and 12) bridging the space between said members and having its ends riveted to the latter, as at 59, whereby said members are rigidly braced at this point. Upon the member 58 is a guide-roller 60 rotatable on a vertical axis and arranged to project between and cooperate with parallel track rails 61, 62, following the same contour and travel of the rails 26, 27, the arrangement being such that the lower end of the mold-carrier is guided and held, and prevented from swinging inward or outward on its support. The rail 61 is supported on suitable brackets 63 rising from the base frame, and the rail 62 is supported by brackets 64 connected to the columns 4 (see Fig. 3). It will be understood that said guide rails include straightaway portions with connecting curved parts at the ends, in substantially the same contour or outline as the supporting track 26, 27, and parallel thereto.

The parts 51 may be provided with stop-plates 51ª, riveted thereto, as at 51ᵇ, and projecting beneath the rail 26, as at 51ᶜ, to prevent vertical displacement of the hanger-frame from said rail (see Figs. 3, 6, 7 and 8).

Novel means constituting part of the invention will now be described for propelling one or more of the hanger-frames with the mold-carriers around the trackways 26, 27, said means preferably providing for a step-by-step travel so that the carriers will have periods of rest during which molds may be placed thereon, and poured or removed therefrom to be shaken out. On each of the studs 24, heretofore described, is a horizontally disposed pulley-wheel 65, turning on an axis concentric with the curved track portion 27, preferably having a laterally directed circumferential flange 66; and passing around the barrel of these pulleys is an endless flexible driving member, preferably in the form of a suitable wire rope or cable 67 which follows the trackway in substantial parallel relation thereto. Novel means is provided for connecting the cable 67 to each hanger-frame, and is constructed to compensate for any deviation from parallelism between the trackway and cable, or any variations in distance between the trackway and cable, said means comprising a link member 68, preferably rigid and having at one end an apertured boss 69 seated on the pin 38 which is rearmost taken in the direction of travel of the hanger-frame 28, whereby said link is pivotally connected to said frame and may swing laterally relative thereto. The opposite end of said link is provided with a head or boss 70 having a vertical opening 71 which sets over and receives the projecting upper end 72 of the foremost pin. The opening 71 is of greater diameter than that of said end 72, so that the link is free to swing laterally on its pivot on the rear pin 38, the swinging movement being limited by engagement of the inside wall of the opening 71 with said pin 72. The circumference of the head 70 is formed on one face with a cylindrical surface 73 located on the side of said head toward the frame, and on its outer side the head is provided with recesses 74. The cable 67 is connected to said link preferably by looping the cable, as at 75, about the said head, over said cylindrical surface and said recesses, and clamping the bight of the loop into said recesses by clamping blocks 76 held in place by screws 77 passing through said blocks and threaded into said head. It will be noted that the leads or sections of the cable forming the loop, cross on the inner side of said head, so that the cable is practically continuous at the point at which it passes around the pulleys (see Fig. 10). The head 70 is provided with a circular flange 77$^a$ which overhangs the cable and is adapted to bear against the circumference of the pulleys 65 during passage of the hanger-frame 27 about said pulleys and thereby relieve the cable of excessive pressure against the pulley. The arrangement is such that when the hanger-frame is passing along the straight part 26 of the trackway, the link assumes the position shown at the right-hand end of Fig. 10, but when the hanger-frame is passing around the curved end 27 of the track, and the link connection passes around the adjacent pulley, the said link connection is free to swing laterally or horizontally to adjust itself to the circumference of the pulley. By the compensating connection just described, the cable and the hanger-frame are free to adjust themselves to the pulley and the supporting trackways, respectively.

It will be understood that in the preferred embodiment the number of hanger-frames and carriers is determined by the capacity it is intended the machine shall have, and that these hanger-frames are spaced as nearly as possible equidistant from each other lengthwise of the cable, as will be readily apparent from Figs. 1 and 2 of the drawings.

Means for propelling the hanger-frames will now be described: On the upper frame extensions 8, heretofore described, is a beam member 78 extending lengthwise of the main frame and which may be supported on and connected to said transverse frame-members 9, said member 78 being braced in position by inclined bracing members 80. Bolted, as at 81, to said member 78, are brackets 82, to which is rigidly secured, in any suitable manner, a horizontal guide-bar or rail 83, upon which travels a puller carriage 84. The puller carriage comprises a body portion having upwardly extending spaced arms 85 receiving the rail 83 between them, and carrying at their upper ends a transverse pin 86 upon which is rotatably mounted a running roller 87 arranged to travel upon the upper horizontal surface of the said rail 83. The carriage is also provided with rearwardly extending arms 88 located beneath the rail 83 and carrying a bearing pin 89 upon which is a running roller 90 adapted to travel upon the under horizontal surface of said rail 83. As shown in Figs. 18 and 19, the pin 86 is provided with a cylindrical bearing portion 86$^a$ which is eccentric to the longitudinal axis of the pin, whereby, upon adjustment of said pin rotatively, the wheel 87 may be adjusted relative to the track rail 83. The proper adjustment of the wheel having been made, the pin will be secured in place by a set screw 86$^b$ let through the part 85 and impinging in the base of a groove 86$^c$ in one end of said pin. A bushing 86$^d$ may be arranged on bearing portion 86$^a$ and be secured in the roller 87, if desired. It will be understood that pin 89 may be, and preferably is, constructed similarly to pin 86 to provide for adjustment of wheel 90.

At the lower portion thereof the arms 88 support a transverse pin 91, upon which is pivotally mounted a connecting device, preferably in the form of a pawl or tappet 92 having a depending end 93 adapted to engage behind a lug or projection 94 integral with the head 70 of the link 68 heretofore described. The pawl is provided with an upwardly extending tail-piece 95 adapted to cooperate with a fixed stop 96 on the carriage to limit movement of the pawl in one direction, so that a rigid connection is made between the carriage and the frame when the carriage is moved forward to propel the frame, but to permit the pawl to yield to ride over a lug 94 and drop to position behind the same when the carriage is moved in the reverse direction to take position to engage a following or subsequent hanger-frame. The preponderance of weight in pawl 92 is in the end carrying the face 93, so that said pawl normally returns to the position shown in dotted lines in Figs. 4 and 6.

The forward end of the puller carriage is provided with a lug 97 into which is threaded, as at 98, one end of a piston rod 99 connected to a piston 100, in a horizontally disposed power cylinder 101 which is supported at its ends by brackets 102 bolted, as at 103, (see Fig. 5), to the supporting member 78 heretofore described.

The power cylinder is preferably of any suitable double-acting type, and is provided at its ends with suitable combined inlet and exhaust ports 104, 105, connected by pipes 106, 107, respectively, to the casing 108 of a four-way control valve of any suitable and well-known type, for example, a Curtis air hoist control valve, by which valve motive pressure agent, for example, compressed air, is led to either end of the cylinder, so that by operation of the valve the piston may be moved first in one direction and then another, and the puller carriage be reciprocated. The valve casing is provided with an air inlet port 109 and an oppositely arranged exhaust port 110, and ports 111 and 112 leading to the pipes 106, 107, respectively. In the valve casing is a rotatable valve disc 113 having a recess 114 adapted upon rotation of the disc to connect either of ports 111, 112 with the exhaust 110. When valve disc 113 is in the position shown so as to connect port 112 with the exhaust 110, the port 111 is uncovered, so that air entering the valve casing through port 109 may pass out through port 111 and pipe 106 to one end of the cylinder to cause the carriage to move in one direction. When the valve disc is moved in the opposite direction to connect port 111 with exhaust port 110, air is permitted to enter the opposite end of the cylinder through pipe 107. The valve disc is provided with an external stem 116, upon which is mounted a plate 117 having oppositely directed levers 118, 119, to one of which is connected a pull-line 119$^a$, by which the valve may be manually operated to control the flow of compressed air to the cylinder 101. The plate 117 is provided with a segmental slot 120 in which is adjustably mounted a pin or bolt 121 which constitutes an anchorage for one end of a spring 122, the other end of which is anchored to a finger 123 rigidly mounted on the supply pipe 124. The spring anchorages 121, 123 are so located that the spring 122 serves to automatically return the valve to one extreme of its movement, in which position air enters the cylinder through pipe 106, thus causing the carriage to be moved to the right to engage a hanger-frame, so that upon operation of the valve by the pull-rod the carriage will feed the hanger-frames forwardly. The swinging movement of plate 117 in both directions is limited by an abutment 125 on the valve casing and adapted to be engaged by faces 125$^a$ on said plate.

In the preferred embodiment the extent of outward movement of carriage 84, when moving toward the position to engage a hanger-frame, is such that said carriage and the pawl 92 will over-ride and pass the lug 94 for a suitable distance, whereby it will be certain that said pawl can always be moved to a position in rear of the lug 94 on the hanger to be propelled, irrespective of the fact that said lugs, due to inaccurate spacing, stretch of cable, etc., might not all come to rest at the same point at which they are to be engaged by said pawl.

At a desirable point in the travel of the mold-carriers, for example, at the pouring station of the machine, which is located at the left-hand end of the structure shown in Figs. 1 and 2, we provide means for placing a mold top-plate in position upon, and removing it from, a mold or molds carried on the mold-carriers. The top-plate is shown at 126 and is provided with marginal flanges 127 and cross-flanges or ribs 128 on its upper face, the cross-ribs merging at their ends with said marginal flanges, as shown in Fig. 13. The top-plate may be perforated throughout its area, as indicated generally at 126$^a$. The means for moving the top-plate into and out of position on the molds comprises a laterally projecting beam or arm 129 rigidly fixed, as at 130, to one end the member 78, the free end of said arm being located at the pouring station and projecting over the path of movement of the molds on the mold-carriers, and carrying at said free end a bracket plate 131, from which plate is suspended a pair of chains 132, the lower ends of which support a transverse horizontal supporting bar 133, the chains being held in spaced relation on said bar 133 by fixed collars 134 on said bar. Suspended at their upper ends, as at 135, from said bar 133, are a pair of suspension bars 136 in the lower ends of which is supported a transverse bar 137, said lower ends being held between fixed collars 138 on said bar 137. On the bar 137 is fulcrumed a rocking member 139 extending upwardly therefrom, and having fixed thereto, as at 140, an operating lever 141, the said point 140 being intermediate the ends of said lever. The lever 141 is formed with a longitudinal slot 142 for a purpose to presently appear. The rear end 143 of the lever 141 is provided with a bracket member 144, having depending arms 145, in the lower end of which is fixed a horizontal bar 146 at a point intermediate the ends of the latter. The ends of the bar 146 carry, respectively, pairs of chains 147, the lower ends of which are connected to eyes 148 fixed to the marginal flanges 127 of the top-plate 126, whereby the latter is connected to the lifting means. It will be readily apparent that by rocking the lever 141 on its fulcrum, the top-plate may be raised or lowered with relation to a mold or flask on a mold-carrier located at the pouring station. The lifting device is provided with locking means to hold the lifting lever 141 in position to maintain the top-plate elevated and free from the mold. This locking means preferably includes a lever 149 pivoted at one end, as at 150, on the bar 133 between fixed collars 151 on the latter, said lever 149 extending downward through the slot 142 and having on its under face a locking recess 152 providing a shoulder 152$^a$. The recess 152 is adapted to receive a lug 153 on the upper side of lever 141, which lug engages under the shoulder 152$^a$, whereby the lever 141 is held in position, which maintains the top-plate elevated (see Fig. 16). When it is desired to lower the top-plate 126, the lever 149 is disengaged from the lever 141, whereby the latter is operable to lower the plate, said lever being controlled by an operator. The movement of lever 141 relative to lever 149 is limited by a stop-pin 154 adapted to strike against the underside of lever 141.

Provision is made for clamping the top-plate 126 in position on a mold or molds while at the pouring station and during the pouring operation, which means will now be described: The side or marginal flanges 127 are provided with pairs of alining guide-members in the form of vertically extending loops 155 secured to said flanges by bolts 156. Through the alining openings in each pair of loops 155 is a clamping member or bar 157, preferably comprising bar members 158 held together by transverse bolts and nuts 159 and maintained in spaced relation to each other by spacing bushings or blocks 160 (see Fig. 13). The central block 160 is provided with a downwardly projecting fulcrum member 161 adapted to contact the upper surface of the top-plate, as shown in Figs. 11 and 14. These bars 157 are arranged in the preferred embodiment to extend at right angles to the direction of travel of the mold-carrier. At their inner ends the bars 157 are provided with inclined locking faces 162 adapted to engage under the inclined locking edge 163 on a locking bar 164 bridging the space between the members 50, and rigidly bolted, as at 165, to said members. Between the forward ends of the members 158 is arranged a slide-block 166 having an elongated slot 167 receiving the spacer block 160, whereby said block 166 is longitudinally movable. At its lower end the block 166 is provided with ears 168 supporting a bearing pin 169 extending through a slot 170 in the shank of a clamping hook 171, the bill 172 of which is adapted and arranged to engage under the bottom board or support 54 to clamp a mold or flask to said support. In the upper end of the block 166 is threaded an adjusting or clamping screw 173, the outer end of which is provided with a handle 174, and the inner end of which is adapted to impinge against the upper end of the block 160 located in the slot 167. When a mold X is to be clamped on the support 54, a top-plate with its clamp or clamps is placed thereon, as shown in Figs. 3, and 11 to 14, and the face 162 is engaged under the bar 164. The operator then engages the bill 172 of the hook 171 under the bottom board or support 54, and operates the screw 173 to thrust downward against the upper end of the block 160 in slot 167, by which operation the hook 171 is pulled up into clamping relation to support 54 and fulcrum 161 allows the bar 157 to rock so that the face 162 is maintained in strong holding relation to the bar 164. The clamp is released by reversing the operation of the screw 173. The slot 167 permits the hook to be moved up, as shown in Fig. 11, so as to be out of the way of the path of travel of the molds.

The operation of the apparatus will be clear from the foregoing description, but it may be briefly stated as follows: Each machine is equipped with a sufficient number of molds X, so that each mold-carrier will be supplied with a mold, which molds are placed on the carriers, as shown in Fig. 1. The mold-making station is located adjacent one of the side runs, for example, at the point indicated "molding station" in Fig. 2; the pouring station is located at the point where the carriers with their molds pass under the top-plate-operating means, as indicated at "pouring station" in Fig. 2, and the shake-out station is located at the extreme right of the apparatus, as indicated at "shake-out station" in Figs. 1 and 2. It will be understood that these stations are located at points to give the greatest efficiency and production under given working conditions.

The molders remove an empty mold flask from the carrier adjacent the molding-station, and make a mold of whatever form may be desired, whereupon the mold is replaced on its carrier. The cylinder 101 is then operated to move the carriage 84 to a position wherein the pawl 92 is in rear of the lug 94 on a carrier immediately in rear of the one upon which a completed mold has just been placed. The travel of the carriage is then reversed, which causes pawl 92 to abut lug 94, whereby the carriage and carrier are coupled and the latter with its mold thereon is moved one step toward the pouring station and another carrier is brought to the molding station. By the operation just described, all of the carriers are advanced one step, inasmuch as they are all connected in train by the cable 67. The molders then complete another mold and place it on its carrier, and the carriage-propelling means is again operated as above described, which serves to bring the carrier supporting the mold first formed to the pouring station to advance the mold just formed one step, and bring another carrier and its mold to the molding station. The workman then operates the top-plate-operating means to lower the top-plate onto the mold at the pouring station, the operation of said means having been previously set forth, and the mold-plate clamp is then applied and operated to clamp the top-plate in position, thereby clamping the mold to the platform 54 or bottom-board. The mold is then poured in any approved manner, and the carrier may rest at this point until the train of carriers are again advanced as heretofore described.

As the mold-carriers are advanced, the poured molds travel the run of the machine on the opposite side of that upon which the molding station is located, and gradually by a step-by-step movement approach the shake-out station, the molds during said travel undergoing a cooling period during which the metal in the molds solidifies and the casting is completed. When a carrier reaches the shake-out station, the mold or flask on the carrier is removed therefrom and shaken out to recover the casting, whereupon the empty flask is replaced on the carrier and is eventually brought to the molding station as before.

What we claim and desire to secure by Letters Patent of the United States, is:—

1. An apparatus of the character described comprising a trackway, a carrier suspended from the trackway, a flexible member extending lengthwise of said trackway, and a rigid link pivoted on said carrier and overlying the same and connecting said carrier to said flexible member, said link swinging freely substantially in the horizontal plane of said flexible member.

2. An apparatus of the character described comprising an endless trackway, a carrier suspended from the trackway, a flexible member adjacent the trackway and movable along the same, and a rigid link having its rear end pivoted to the carrier at the rear portion thereof and its forward end connected to said flexible member at a point in advance of its pivot on the carrier.

3. An apparatus of the character described comprising an endless trackway, a carrier suspended from the trackway, a flexible member adjacent the trackway and movable along the same, a link having its rear end pivoted to the carrier at the rear portion thereof and its forward end connected to said flexible member at a point in advance of its pivot on the carrier, and means for limiting swinging movement of the forward end of said link.

4. An apparatus of the character described comprising an endless trackway, a carrier suspended from the trackway, an endless flexible member adjacent said trackway and movable along the same, and a compensating member pivoted at one end on said carrier to swing in a substantially horizontal plane and having its opposite end connected to said flexible member, said last-named end of said compensating member being slidably mounted on said carrier.

5. An apparatus of the character described comprising an endless trackway, a carrier movable along the trackway and having a compensating running connection with the trackway, a flexible member adjacent the trackway and movable along the same, an automatic compensating connection between said carrier and said flexible member and acting to compensate for variation in distance between said trackway and said flexible member, and means acting through said connection to move said flexible member.

6. An apparatus of the character described comprising a trackway, a carrier suspended from the trackway, a flexible member extending lengthwise of said trackway, an automatic compensating connection between said carrier and said flexible member and acting to compensate for variation in distance between said trackway and said flexible member, and means for propelling said carrier by a step-by-step movement.

7. An apparatus of the character described comprising a trackway, a carrier suspended from the trackway, a flexible member extending lengthwise of said trackway, a compensating connection between said carrier and said flexible member, and reciprocating means for propelling said carrier.

8. An apparatus of the character described comprising a trackway, a carrier suspended from the trackway, a flexible member extending lengthwise of said trackway, a compensating connection between said carrier and said flexible member, and reciprocating means for propelling said carrier by a step-by-step movement.

9. An apparatus of the character described comprising a trackway, a carrier suspended from the trackway, a flexible member extending lengthwise of said trackway, a compensating connection between said carrier and said flexible member, and means adapted to cooperate with said compensating connection to propel said carrier.

10. An apparatus of the character described comprising a trackway, a carrier suspended from the trackway, a flexible member extending lengthwise of said trackway, a compensating connection between said carrier and said flexible member, and reciprocating means adapted to cooperate with said compensating connection to propel said carrier.

11. An apparatus of the character described comprising an endless trackway, a plurality of carriers suspended from said trackway, an endless flexible member adjacent said trackway and movable along the same, means for individually connecting each of said carriers to said member and in spaced relation to each other, and reciprocating means adapted to engage the carriers to propel the same along said trackway.

12. An apparatus of the character described comprising an endless trackway, a plurality of carriers suspended from said trackway, an endless flexible member adjacent said trackway and movable along the same, means for individually connecting each of said carriers to said member and in spaced relation to each other, and reciprocating means adapted to engage the carriers to propel the same by a step-by-step movement along said trackway.

13. An apparatus of the character described comprising an endless trackway, a plurality of carriers suspended from said trackway, an endless flexible member adjacent said trackway and movable along the same, means for individually connecting each of said carriers to said flexible member and in spaced relation to each other, and means adapted to engage the carriers individually to propel the same along said trackway.

14. An apparatus of the ccharacter described comprising an endless trackway, a plurality of carriers suspended from said trackway, an endless flexible member adjacent said trackway, means for individually connecting each of said carriers to said flexible member and in spaced relation substantially equidistant from each other, and reciprocating means adapted to engage the carriers to propel the same along said trackway, said means having movement greater than the distance between the carriers.

15. An apparatus of the character described comprising a trackway, a carrier suspended from the trackway, a flexible member extending lengthwise of the trackway, a link pivoted to the carrier and connected to said flexible member, an abutment face on said link, and means adapted to engage said abutment face to propel the carrier along the trackway.

16. An apparatus of the character described comprising a trackway, a carrier suspended from the trackway, a flexible member extending lengthwise of the trackway, a link pivoted to the carrier and connected to said flexible member, an abutment face on said link, and reciprocating means adapted to engage said abutment face to propel the carrier along the trackway.

17. An apparatus of the character described comprising a trackway, a carrier suspended from the trackway, a flexible member extending lengthwise of the trackway, a link pivoted to the carrier and connected to said flexible member, an abutment face on said link, and reciprocating means having a trip-device to engage said abutment face to propel the carrier along the trackway.

18. An apparatus of the character described comprising an endless trackway, a plurality of carriers suspended from said trackway, an endless flexible member adjacent said trackway and movable along the same, means for individually connecting each of said carriers to said member in spaced relation to each other, a guide rail extending lengthwise of said trackway, a carriage adapted to travel on said guide rail, means for reciprocating said carriage along the guide rail, and means on said carriage for engaging said carriers whereby the latter can be propelled by said carriage.

19. An apparatus of the character described comprising an endless trackway, a plurality of carriers suspended from said trackway, an endless flexible member adjacent said trackway and movable along the same, means for individually connecting each of said carriers to said member in spaced relation to each other, a guide rail extending lengthwise of said trackway, a carriage adapted to travel on said guide rail, means for reciprocating said carriage along the guide rail, and a pivotal pawl on said carriage for engaging said carriers whereby the latter can be propelled by said carriage.

20. An apparatus of the character described comprising an endless trackway, a plurality of carriers suspended from said trackway, an endless flexible member adjacent said trackway and movable along the same, means for individually connecting each of said carriers to said member in spaced relation to each other, a guide rail extending lengthwise of said trackway, a carriage adapted to travel on said guide rail, means for reciprocating said carriage along the guide rail, a pivotal pawl on said carriage for engaging said carriers whereby the latter can be propelled by said carriage, and means for limiting swinging movement in one direction of said pawl.

21. An apparatus of the character described comprising an endless trackway including straightaway portions joined by curved portions, rotatable pulleys located at said curved portions, carriers suspended from said trackway, a flexible member movable along said trackway and passing around said pulleys, the path of movement of said flexible member being within the contour of said trackway, and compensating connections between said carriers and said flexible member, said connections compensating for any varying distance between said flexible member and trackway.

22. An apparatus of the character described comprising an endless trackway, a carrier suspended from the trackway, a flexible endless member adjacent the trackway and movable along the same, a rigid member extending in the direction of movement of said carrier and having one end pivoted to said carrier, said rigid member having a head at its opposite end, to which head the flexible member is connected, said head having an opening therethrough, and means extending into said opening for permitting a limited movement of said rigid member on its pivot.

23. An apparatus of the character described comprising a trackway, a carrier frame, oscillating frames on said carrier frame, each oscillating frame carrying a running roller bearing on the tread of said trackway, and guide rollers on each of said oscillating frames and coacting with said trackway to retain said running roller on said trackway.

24. An apparatus of the character described comprising a trackway, a carrier frame, oscillating frames on said carrier frame, each oscillating frame carrying a running roller bearing on the tread of said trackway, guide rollers on each of said oscillating frames and coacting with said trackway to retain said running roller on said trackway, a flexible member extending along said trackway, and a compensating connection between said carrier frame and said flexible member.

25. An apparatus of the character described comprising a trackway, a carrier frame, oscillating frames on said carrier frame, each oscillating frame carrying a running roller bearing on the tread of said trackway, guide rollers on each of said oscillating frames and coacting with said trackway to retain said running roller on said trackway, a flexible member extending along said trackway, and a link pivoted at one end to said carrier frame and connected at its other end to said flexible member.

26. An apparatus of the character described comprising an endless trackway having straightaway portions joined by curved portions, pulleys located within said curved portions, an endless flexible member extending along said trackway and around said pulleys, a plurality of hanger-frames having flexible running connections with said trackway, a compensating connection between each hanger-frame and said flexible member, and means preventing lateral swinging movement of said hanger-frames relative to said trackway.

27. An apparatus of the character described comprising an endless trackway having straightaway portions joined by curved portions, pulleys located within said curved portions, an endless flexible member extending along said trackway and around said pulleys, a plurality of hanger-frames having flexible running connections with said trackway, a compensating connection between each hanger-frame and said flexible member, means preventing lateral swinging movement of said hanger-frames relative to said trackway, and reciprocable means movable lengthwise of said trackway and adapted to individually engage said hanger frames to propel the same along the trackway.

28. An apparatus of the character described comprising an endless trackway having straightaway portions joined by curved portions, pulleys located within said curved portions, an endless flexible member extending along said trackway and around said pulleys, a plurality of hanger-frames having flexible running connections with said trackway, a compensating connection between each hanger-frame and said flexible member, means preventing lateral swinging movement of said hanger-frames relative to said trackway, and fluid pressure operated reciprocable means movable lengthwise of said trackway and adapted to individually engage said hanger-frames to propel the same along the trackway.

29. An apparatus of the character described comprising an endless trackway having parallel straightaway portions joined at the ends by curved portions, pulleys arranged in said curved portions and the circumferences of which are within the said curved track portions, a flexible endless member supported by said pulleys and movable along said endless trackway, hanger-frames each having flexible running supports on said trackway, a laterally movable link pivoted at one end to the rear portion of each frame and said link extending in the general direction of travel of the frame and having its forward end connected to said flexible member, a guide member extending lengthwise of said track, a carriage reciprocable on said guide member and adapted to be coupled to a hanger-frame to move the latter, and means for reciprocating said carriage.

30. An apparatus of the character described comprising an endless trackway, a carrier suspended from the trackway, a flexible endless member adjacent the trackway, pulleys supporting said endless member, a connecting member having one end movably connected to the carrier and its other end connected to said flexible member, and a projection on said connecting member and extending beyond said cable to engage said pulleys when passing around the same.

31. An apparatus of the character described comprising an endless trackway, a carrier suspended from the trackway, a flexible endless member adjacent the trackway, pulleys supporting said endless member, a connecting member having one end movably connected to the carrier and its other end connected to said flexible member, and a lateral flange on said connecting member and extending beyond said cable to engage said pulleys when passing around the same.

32. An apparatus of the character described comprising an endless trackway including straightaway portions joined by curved portions, rotatable pulleys located within said curved portions, carriers suspended from said trackway, an endless flexible member movable along the trackway and passing around said pulleys, compensating connections between said carriers and said flexible member, said connections compensating for any variation in lateral distance between said flexible member and trackway, and means adapted to act on certain of said carriers to move said flexible member whereby all of said carriers are moved simultaneously along said trackway.

In witness whereof I, ARCHER A. LANDON, have hereunto subscribed my name.
ARCHER A. LANDON.

In witness whereof I, SHERWOOD C. BLISS, have hereunto subscribed my name.
SHERWOOD C. BLISS.